United States Patent
Papakipos et al.

(10) Patent No.: US 9,348,364 B2
(45) Date of Patent: May 24, 2016

(54) CONTENT SCROLLING AND TRANSITIONING USING TOUCHPAD INPUT

(75) Inventors: Matthew Nicholas Papakipos, Palo Alto, CA (US); Matthew Cahill, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/229,373

(22) Filed: Sep. 9, 2011

(65) Prior Publication Data

US 2013/0063362 A1 Mar. 14, 2013

(51) Int. Cl.
- *G06F 3/041* (2006.01)
- *G06F 3/033* (2013.01)
- *G06F 1/16* (2006.01)
- *G06F 3/0485* (2013.01)

(52) U.S. Cl.
CPC ............ *G06F 1/1626* (2013.01); *G06F 1/1643* (2013.01); *G06F 3/0485* (2013.01)

(58) Field of Classification Search
CPC . G06F 3/0485; G06F 3/04855; G06F 3/0486; G06F 3/0487; G06F 2203/0339; G06F 1/1626; G06F 1/1643
USPC .................................................. 345/156–175
See application file for complete search history.

(56) References Cited

U.S. PATENT DOCUMENTS

| | | | | |
|---|---|---|---|---|
| 6,043,809 | A * | 3/2000 | Holehan | 345/168 |
| 7,103,851 | B1 * | 9/2006 | Jaeger | 715/786 |
| 2003/0142081 | A1 * | 7/2003 | Iizuka et al. | 345/173 |
| 2007/0097089 | A1 | 5/2007 | Battles | |
| 2007/0211039 | A1 * | 9/2007 | Chen et al. | 345/173 |
| 2009/0002335 | A1 | 1/2009 | Chaudhri | |
| 2009/0256809 | A1 | 10/2009 | Minor | |
| 2010/0056221 | A1 * | 3/2010 | Park | 455/566 |
| 2010/0079395 | A1 * | 4/2010 | Kim et al. | 345/173 |
| 2010/0142127 | A1 * | 6/2010 | Johansson | 361/679.01 |
| 2010/0315337 | A1 * | 12/2010 | Ferren et al. | 345/158 |
| 2010/0315356 | A1 * | 12/2010 | Ferren et al. | 345/173 |
| 2011/0122085 | A1 | 5/2011 | Chang | |

FOREIGN PATENT DOCUMENTS

| | | |
|---|---|---|
| KR | 10-2011-0042833 | 4/2011 |
| KR | 10-2011-0068666 | 6/2011 |

OTHER PUBLICATIONS

International Search Report and Written Opinion for International Application No. PCT/US2012/051248, Jan. 2, 2013.
Office Action for U.S. Appl. No. 13/275,145, May 22, 2013.
Final Office Action for U.S. Appl. No. 13/275,145, Mar. 4, 2014.
Notice of Allowance for U.S. Appl. No. 13/275,145, Jun. 10, 2014.
Response to Office Action for U.S. Appl. No. 13/275,145, Nov. 22, 2013.
Response to Final Office Action for U.S. Appl. No. 13/275,145, Jun. 4, 2014.

* cited by examiner

*Primary Examiner* — Amit Chatly

(74) *Attorney, Agent, or Firm* — Baker Botts L.L.P.

(57) ABSTRACT

In one embodiment, a user of a mobile device controls a scrollable application user interface by using touch inputs to the mobile device's side-mounted touchpad.

13 Claims, 13 Drawing Sheets

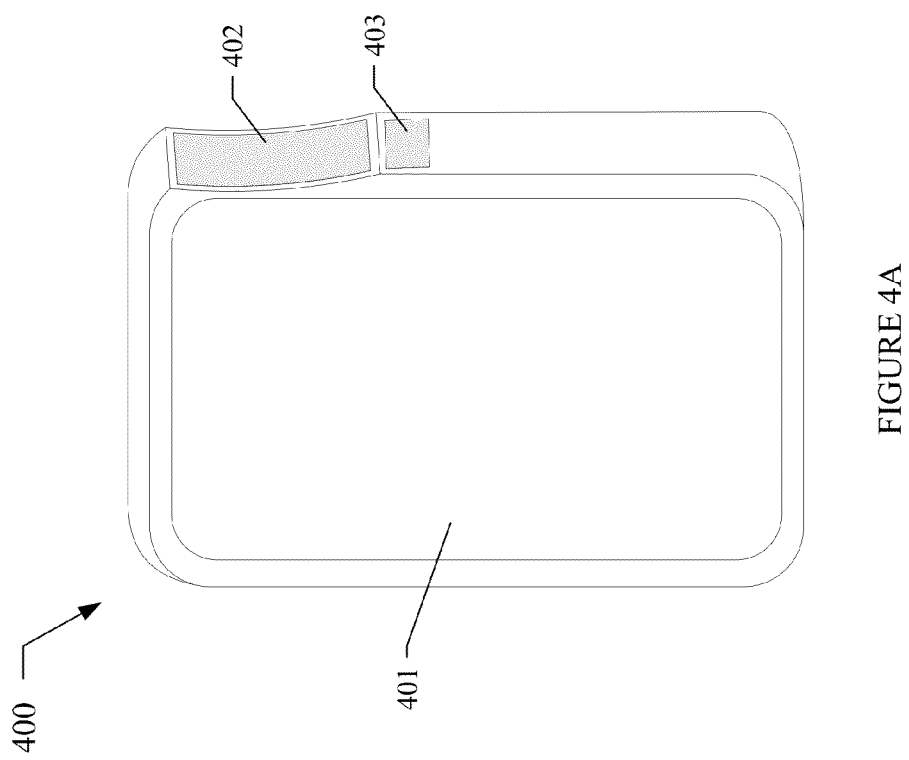

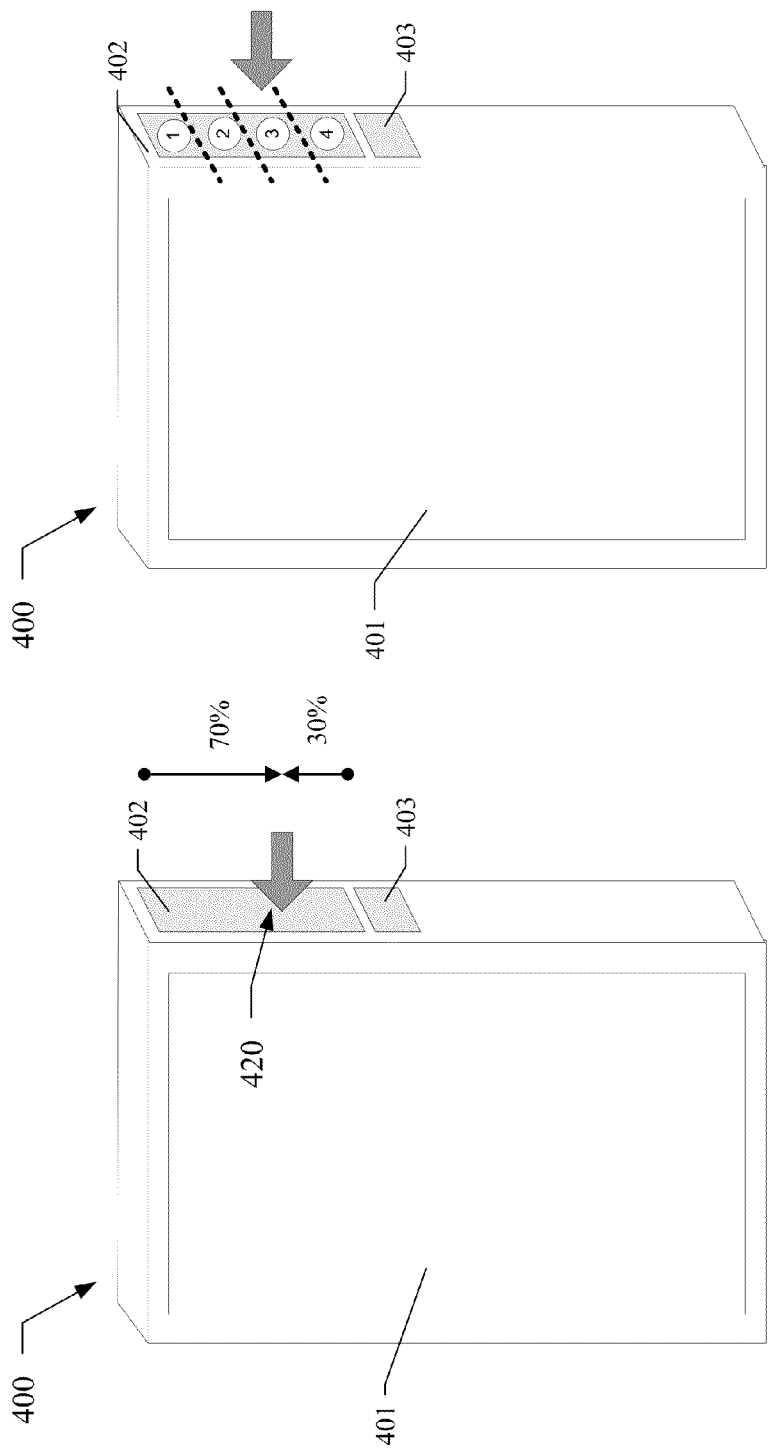

CONTENT SCROLLING AND TRANSITIONING USING TOUCHPAD INPUT

TECHNICAL FIELD

The present disclosure relates generally to touch-based user interfaces, and more particularly to, controlling a scrollable application user interface by a computer device having a side-mounted touchpad.

BACKGROUND

A touchpad is an input device including a surface that detects touch-based inputs of users. A touch screen is an electronic visual display that detects the presence and location of user touch inputs. Mobile devices such as a mobile phone, a tablet computer, and a laptop computer often incorporate a touch screen or a touchpad to facilitate user interactions with application programs running on the mobile device.

SUMMARY

Particular embodiments relate to touch-based user interfaces that allow a user of a computing device to control a scrollable application user interface by using touch inputs to a side-mounted touchpad. These and other features, aspects, and advantages of the disclosure are described in more detail below in the detailed description and in conjunction with the following figures.

BRIEF DESCRIPTION OF THE DRAWINGS

FIG. 4A illustrate another example of the mobile device in FIG. 4.

FIGS. 5A-5F illustrate example touch events associated with the example mobile device of FIG. 4.

DETAILED DESCRIPTION

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Figure 1:
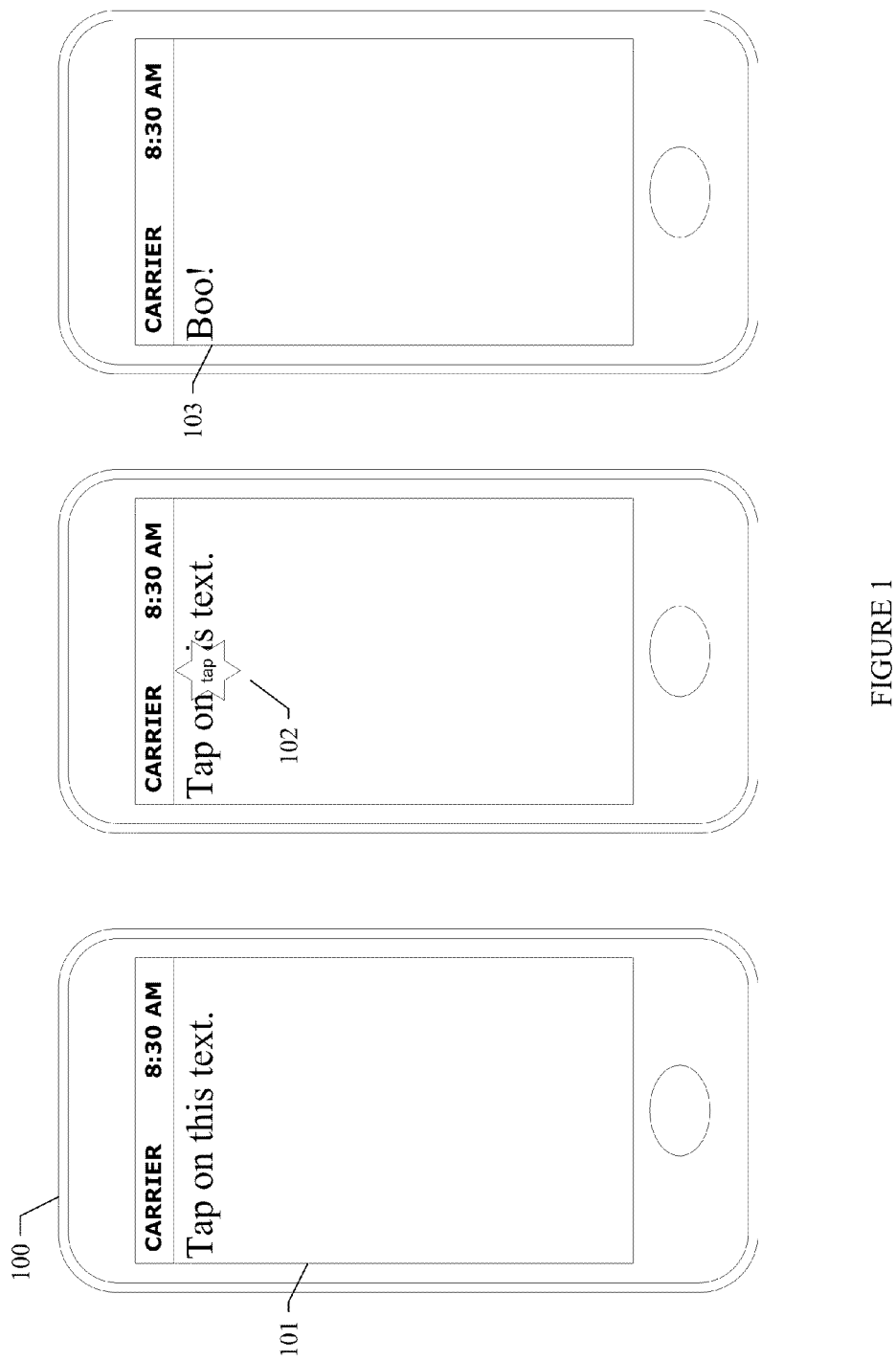
FIG. 1 illustrates an example touch screen of a mobile phone that hosts a browser client displaying a web page.

A touchpad is an input device including a surface that detects touch-based inputs of users. Similarly, a touch screen is an electronic visual display that detects the presence and location of user touch inputs. So-called dual touch or multi-touch displays or touchpads refer to devices that can identify the presence, location and movement of more than one touch input, such as two or three finger touches. A system incorporating one or more touch-based input devices may monitor one or more touch-sensitive surfaces for one or more touch or near touch inputs from a user. When one or more such user inputs occur, the system may determine the distinct area(s) of contact and identify the nature of the touch or near touch input(s) via geometric features and geometric arrangements (e.g., location, movement), and determine if such inputs correspond to various touch events (e.g., tap, drag, swipe, pinch). These touch events may then be processed by handler functions that register or subscribe as listeners to such events, as illustrated in FIG. 1. FIG. 1 illustrates an example touch screen of a mobile phone that hosts a browser client displaying a web page. In the example of FIG. 1, touch screen 101 of mobile phone 100 displays an HTML/JavaScript code snippet displaying a text string "Tap on this text", as listed below.

```
<html>
<!-- pseudo-code to include a touch event listener from a touch events
library
library TouchEventsLibrary
function onTapEvent
-->
<body>
<h1 onTapEvent="this.innerHTML='Boo!'">Click on this text</h1>
</body>
</html>
```

As a user taps on the text string "Tap on this text." (102), a touch event listener "on TouchEvent" can trigger an action of changing the text string from "Tap on this text." to "Boo!" (103).

Figure 2:
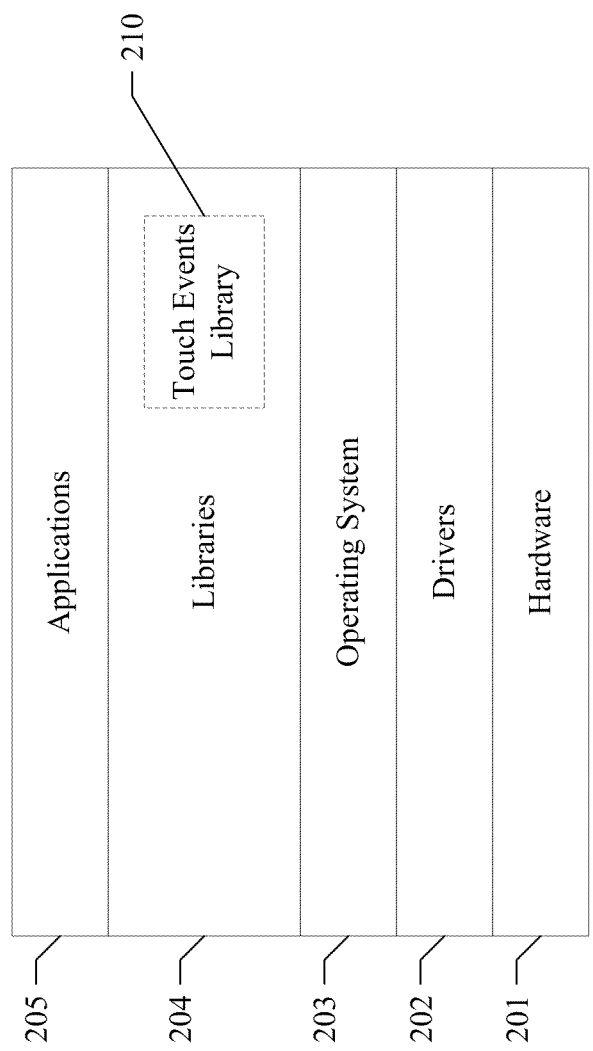
FIG. 2 illustrates an example processing stack of a mobile device with touch-based input device(s).

Recognition of touch events by a system with one or more touch-based input devices—i.e., identifying one or more touch inputs by a user and determining corresponding touch event(s)—may be implemented by a combination of hardware, software, and/or firmware (or device drivers). FIG. 2 illustrates an example processing stack of a mobile device (e.g., a smart phone) with touch-based input device(s). Hardware layer 201 can include one or more processors and various hardware input/output devices such as camera, communication interface, and touch-based input device (e.g., touch screen, touchpad). Drivers layer 202 includes one or more drivers that communicate and control hardware layer 200, for example, a driver receiving and processing touch input signals generated by a touch-screen display. Operating system 203 runs computing programs and manages hardware layer 201 via one or more drivers in driver layer 202. Libraries 204 includes one or more libraries used by one or more application programs in applications 205 (e.g., web browser, address book, etc.). For example, touch events library 210 can contain codes that interpret touch inputs to touch events or gestures, and a web browser application program can access touch event library 210 (e.g., via function calls) and process a web page with touch event handlers embedded within the page, as illustrated in FIG. 1 and in the HTML/JavaScript code snippet above.

Figure 3:
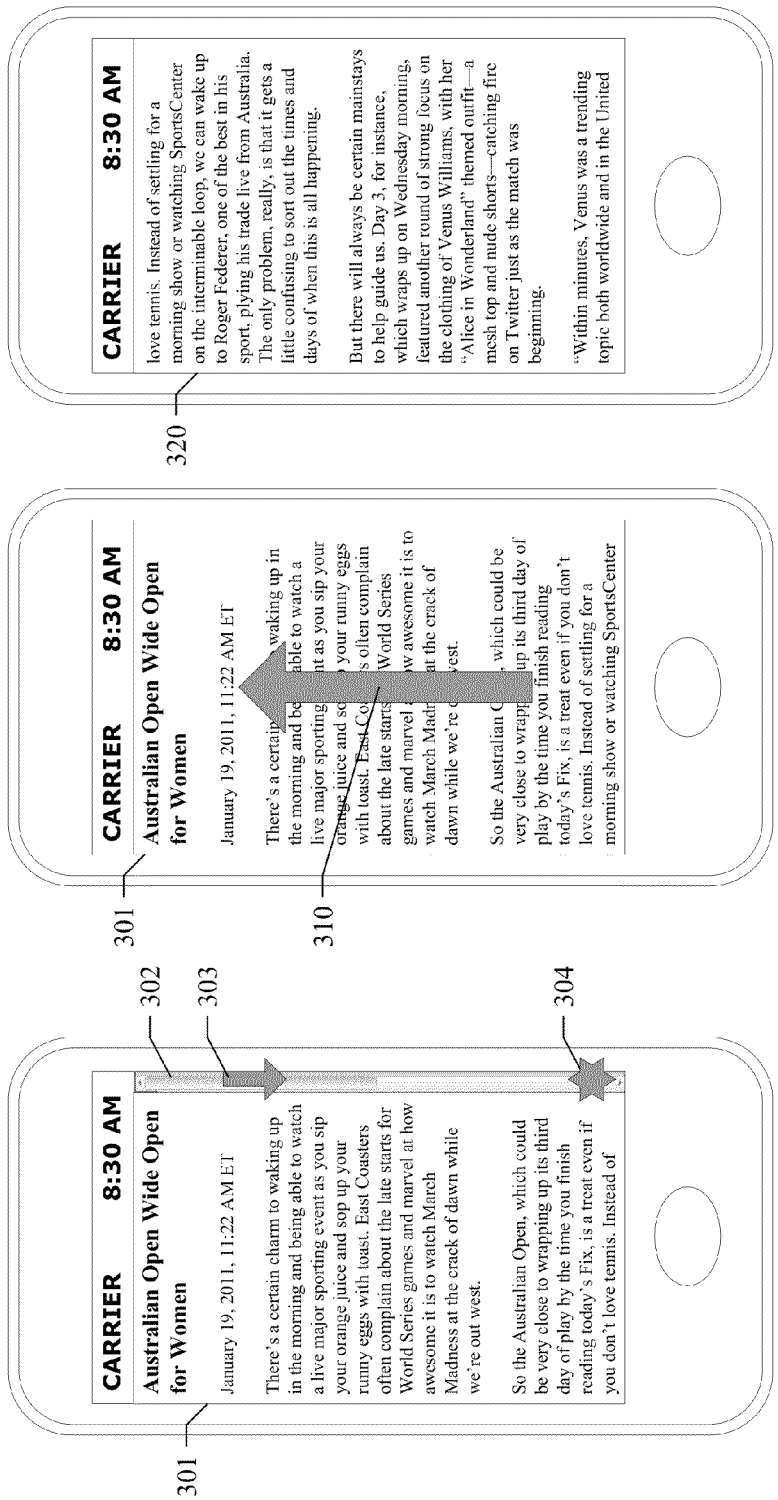
FIG. 3A-3C illustrate an example method of scrolling a web page displayed by a web browser client application hosted by a touch-screen device.

A user interface of an application hosted by a computing device, or an application user interface, often includes a scroll bar for scrolling upwards/downwards the application user interface, or transitioning display of the application user interface to a particular position, i.e., transitioning display of the application user interface to a particular position of the content being displayed by the application user interface. For example, a user of a web browser application displaying a web page can move a scroll bar of the web browser application downwards to scroll down the web page, or directly go to the end of the web page by moving the scroll bar to the bottom of the scroll bar column. With a touch-screen device, a user can often scroll upwards or downwards of a user interface of an application hosted on the touch-screen device by touch gestures performed on the touch screen. FIG. 3A-3C illustrate example methods of scrolling a web page displayed by a web browser client application hosted by a touch-screen device. In the example of FIG. 3A, a user of the touch-screen device can scroll down display of the web page 301 by touching and dragging down scroll bar 302 gradually, as illustrated by arrow 303, or go to the end (or another particular position) of the web page by tapping the end of scroll bar column (304). Alternatively, a user of the touch-screen device can scroll down display of the web page 301 by a swiping gesture on the touch-screen displaying the web page, as illustrated by arrow 310 in FIG. 3B, the current screen will change to display the next available portion of the web page (320), as illustrated in 3C, or scroll down display of the web page 301 by an increment as the same as the length of the swiping gesture.

Figure 4:
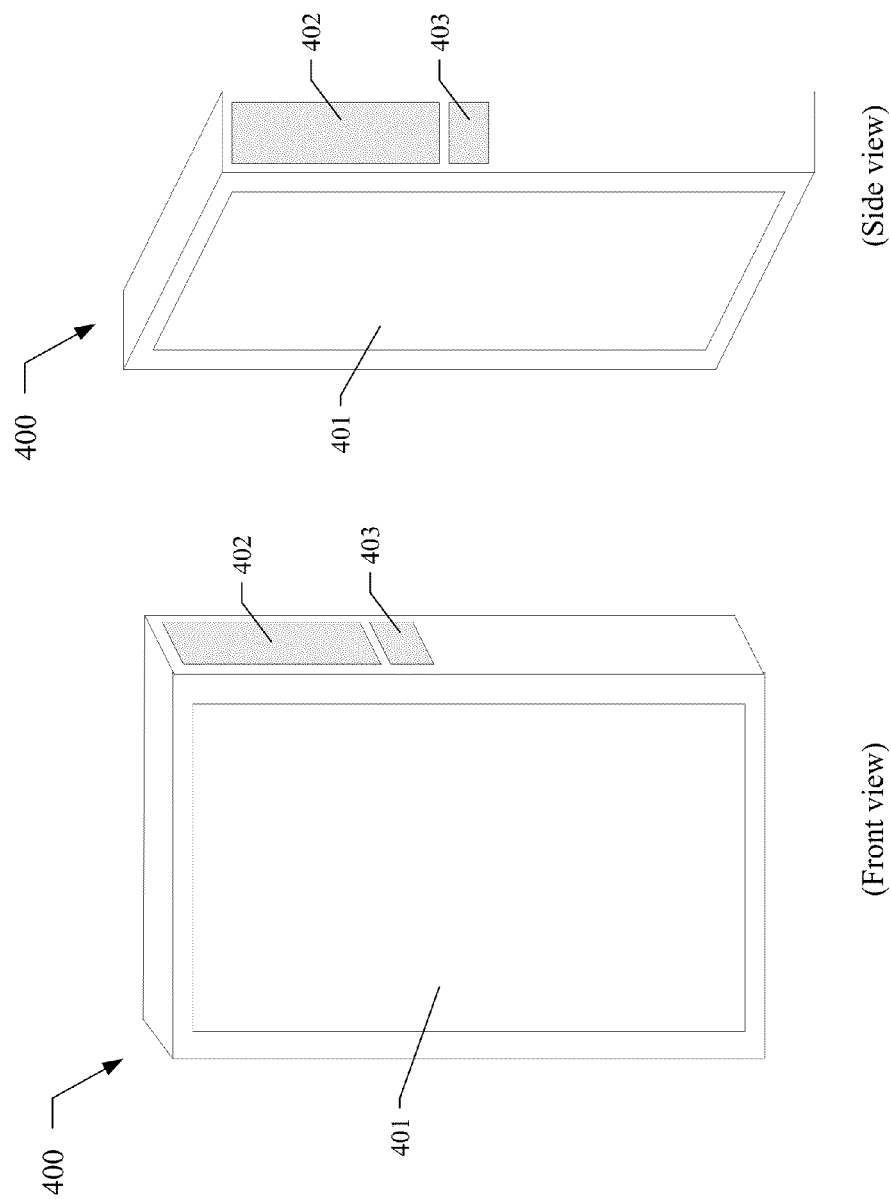
FIG. 4 illustrates a front view and a side view of an example mobile device with a front-mounted touch screen and a side-mounted touchpad.
Figure 4B:
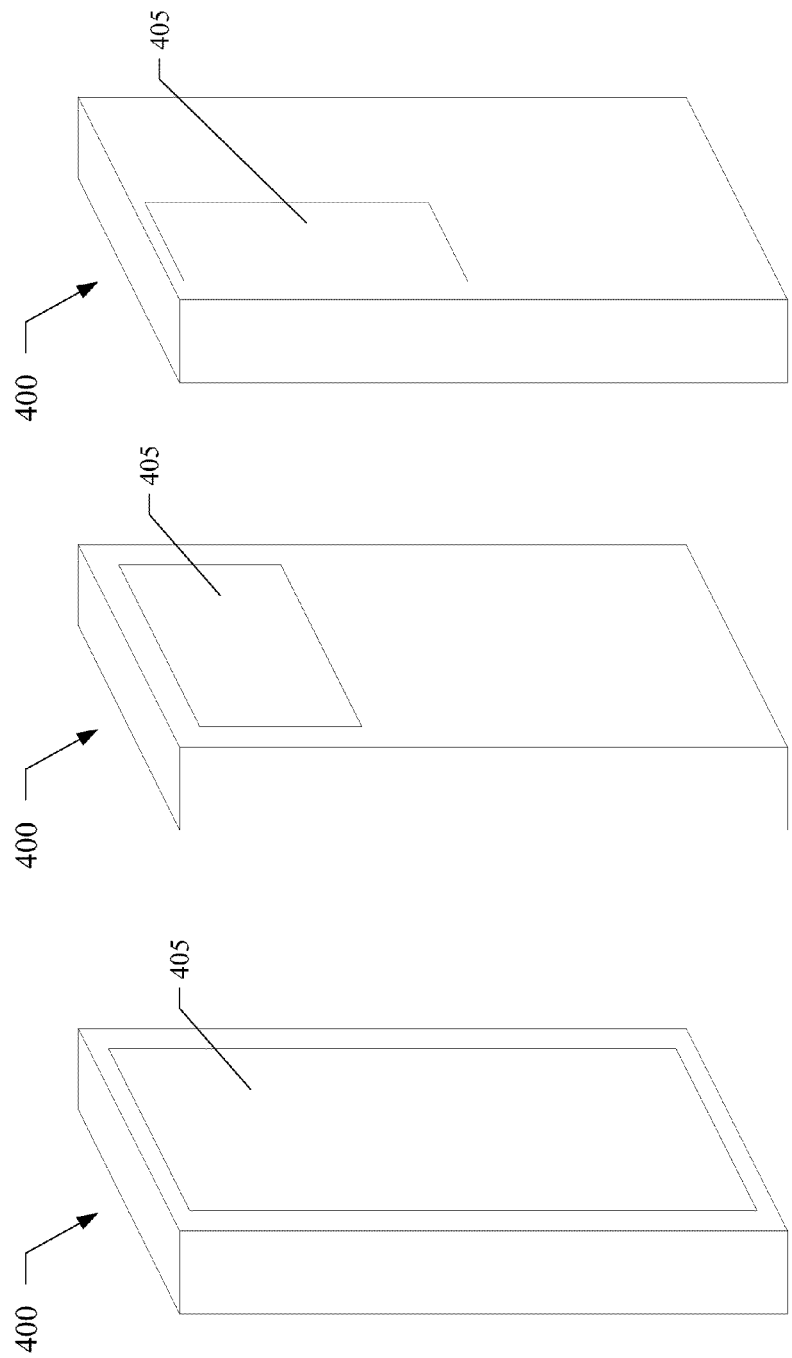
FIG. 4B illustrate an example mobile device with a back-mounted touch surface.

Particular embodiments herein relate to a computing device (such as a mobile phone, netbook, smartphone, tablet, or other portable device) with a touch screen and one or more side-mounted touchpads and methods of allowing users to use the one or more side-mounted touchpads to scroll and transition an application user interface. Particular embodiments can improve user experience associated with mobile devices as the side-mounted touchpad(s) can offload user interaction to the side-mounted touchpad(s) and yield better usage of the touch screen (e.g., uninterrupted viewing of a content displayed by the touch screen). FIG. 4 illustrates a front view and a side view of an example mobile device with a front-mounted touch screen and a side-mounted touchpad. In particular embodiments, mobile device 400 may comprise a housing with front-mounted multi-touch touch screen 401 disposed on a front face of the housing. The mobile device 400 may also include a side-mounted multi-touch touchpad 402, and a side-mounted single-touch touchpad 403, both disposed on a lateral face or edge of the device 400. In particular embodiments, mobile device 400 may include hardware and/or software that supports or implements a variety of functions. For example, mobile device 400 may support telephony functions, chat and/or email functions. Mobile device 400 may also support network data communications and include a web browser for accessing and displaying web pages. Mobile device 400 may also support or incorporate, a Wi-Fi base station device functions, a digital media player device functions, and/or a gaming device functions. In one embodiment, the side-mounted touchpad 403 may be replaced by a clickable button or keypad device. In another embodiment, the side-mounted touchpad 403 may be a multi-touch touchpad. In some implementations, the touchpad 402 may be a single- or multi-touch device. In some embodiments, side-mounted touchpad 402 may comprise a slightly concave multi-touch surface, as illustrated in FIG. 4A. The touch screen 401 and side-mounted touchpad 403 may be single-touch, dual-touch or multi-touch devices. In addition, implementations of the invention can operate without a touch screen device, relying instead on a regular display device and a pointer device, such as a trackball or trackpad. In other embodiments, mobile device 400 may include a back-mounted touch surface 405 on a back side of mobile device 400. The back-mounted touch surface 405 may cover substantially all or a portion of a back side of mobile device 400, as illustrated in FIG. 4B. The back-mounted touch surface 405 may comprise a multi-touch touchpad or a multi-touch touch screen.

Figures 5A, 5B:
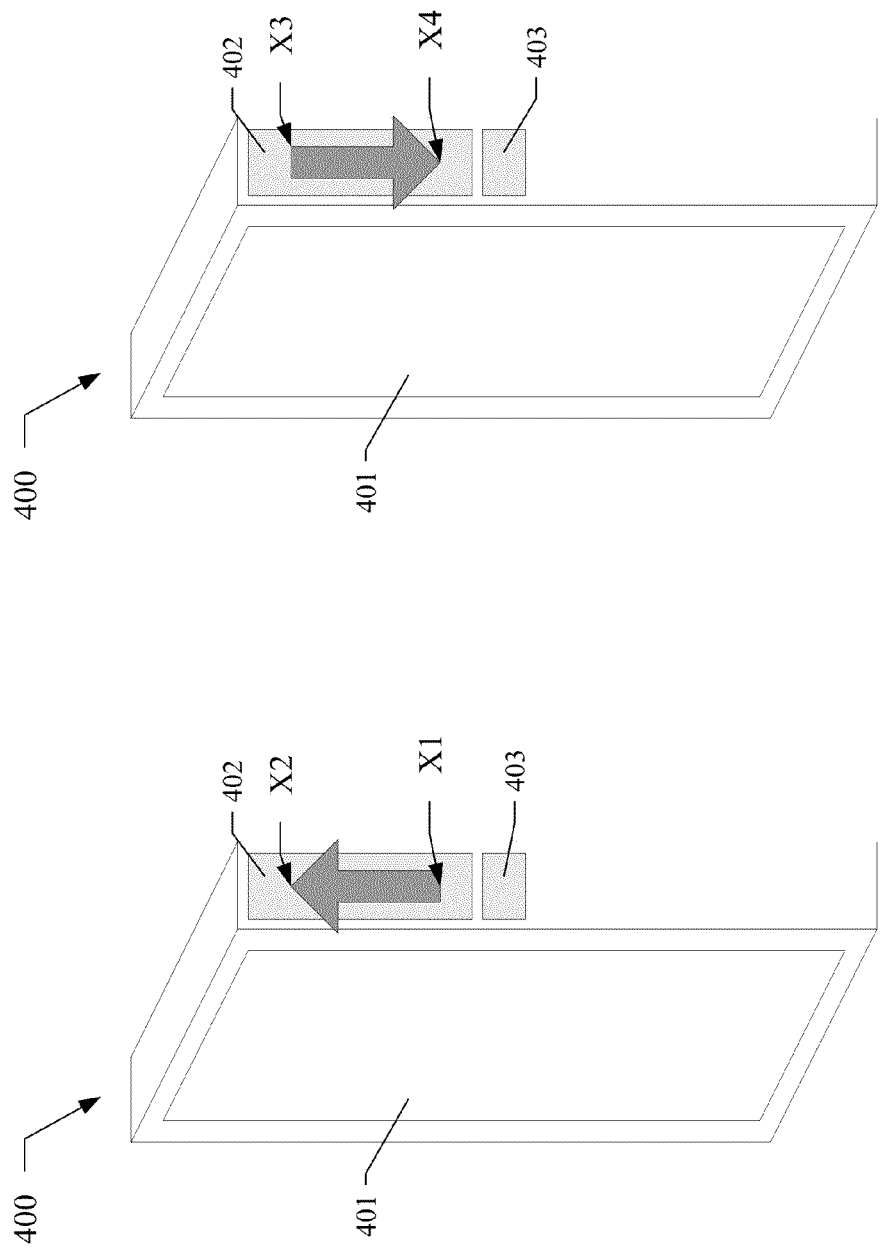

Mobile device 400 may recognize touch inputs, and determine one or more corresponding touch events or gestures. One or more applications hosted on mobile device 400 may be configured to register a handler function that responds to the one or more touch events. In particular embodiments, mobile device 400 may recognize one or more user touch inputs performed on touch screen 401, touchpad 402, touchpad 403, and/or back-mounted touch surface 405, and determine one or more corresponding touch events. In particular embodiments, mobile device 400 may detect an upward scrolling event associated with touchpad 402 based on a corresponding scrolling touch gesture of a user, as illustrated in FIG. 5A. In the example of FIG. 5A, a user touches touchpad 402 in a upward motion (e.g., the user's finger touches touchpad 402 at a location X1, moves the finger upwards while the finger is still in contact with touchpad 402, and the finger lifts away from touchpad 402 at the location X2 wherein the location X2 is closer to the top of mobile device 400 then the location X1, as indicated by the arrow in FIG. 5A) A gesture recognition library of mobile device 400 may access data generated by touchpad 402 and determine a upward scrolling event or gesture associated with touchpad 402. A handler function associated with an application or operating system shell may cause a document or other displayed content to scroll. In particular embodiments, mobile device 400 may determine a downward scrolling event associated with touchpad 402, as illustrated in FIG. 5B. In the example of FIG. 5B, a user touches touchpad 402 in a downward motion (e.g., the user's finger touches touchpad 402 at a location X3, moves the finger downwards while the figure is still in contact with touchpad 402, and the finger lifts away from touchpad 402 at the location X4 wherein the location X3 is closer to the top of mobile device 400 then the location X4, as indicated by the arrow in FIG. 5B), and mobile device 400 may determine a downward scrolling event associated with touchpad 402. The upwards or downwards gestures made by a user may be controlled scrolling gestures where the movement is slow relative to a swiping gesture where the associated downward or upward movement is relatively abrupt or fast. A gesture recognition library of mobile device 400 may interpret the inputs from touchpad 402 to recognize either gesture type. A handler function may respond differently between a controlled scroll and a swipe gesture. For example, a swipe gesture may cause an application to rapidly scroll a document based on the speed of the swipe. On the other hand, an application may respond to a controlled scrolling event by scrolling the document or other content in a manner proportional to the user's movements relative to touchpad 402.

In particular embodiments, mobile device 400 may identify a tap event with a tap location associated with touchpad 402, as illustrated in FIG. 5C. In the example of FIG. 5C, a user taps or strikes lightly on touchpad 402 (as indicated by the arrow 420) A gesture recognition library of mobile device 400 can interpret the user's touch input and determine the touch input corresponding to a tap event with a tap location.

The tap event may be a single-tap and/or a double-tap event. In some implementations, a single tap may have a different effect than a double tap. In particular embodiments, mobile device 400 may identify a tap location of a tap event based on the tap event's a relative location within touchpad 402. For example, in FIG. 5C, a gesture recognition library of mobile device 400 can interpret a relative tap location of a tap event (as illustrated by the arrow) as 70% from the top of touchpad 402, or 30% from the bottom of touchpad 402. For example, if touchpad 402 is 5 cm in length and a user taps on touchpad 402 at a location 3.5 cm from the top of touchpad 402, one or more programs (e.g., a device driver for touchpad 402 and one or more programs from a touch event library as illustrated in FIG. 2) can determine an absolute location (3.5 cm from the top) of the user's touch input, and translate the user's touch input to a tap event with relative location of 70% (i.e., 3.5 divided by 5) from the top of touchpad 402. In one implementation, the touchpad 402 can, in response to a tap event, return the coordinates of the tap event, which a device driver can convert into a relative location or zone. In other embodiments, mobile device 400 may identify a tap location of a tap event based on a plurality of zones dividing touchpad 402, as illustrated in FIG. 5D. In the example of FIG. 5D, touchpad 402 is divided into 4 zones (zone 1 to zone 4), and a gesture recognition library of mobile device 400 can interpret a tap location of zone 3 for a tap event illustrated by the arrow. In other words, a tap event having a position anywhere within a given region or zone is classified and processed similarly.

Figure 5F:
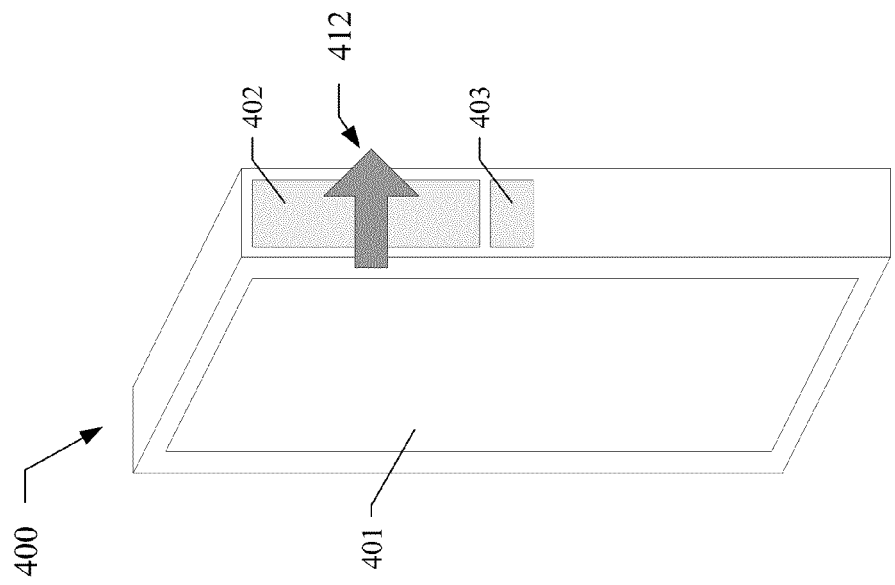
Figure 5E:
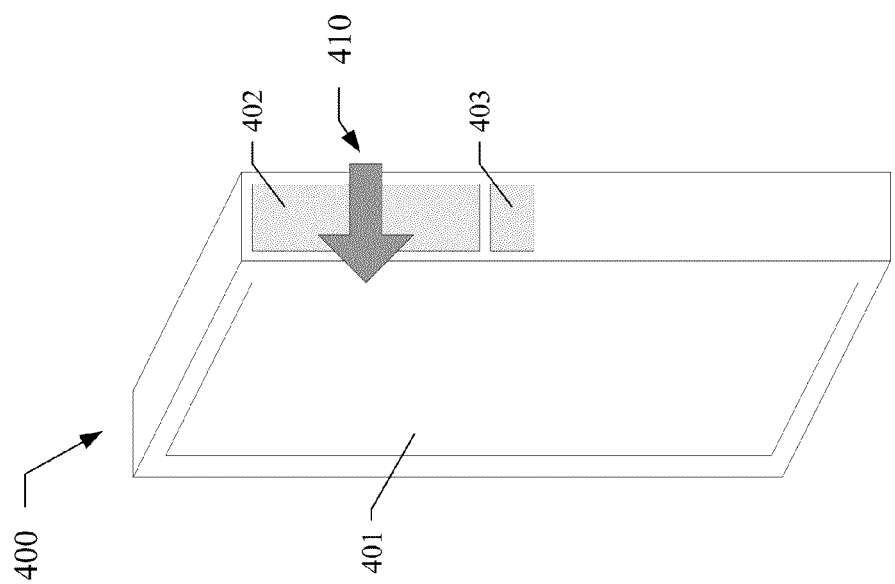

In particular embodiments, mobile device 400 may identify a lateral flick event associated with touchpad 402, as illustrated in FIGS. 5E and 5F. In the example of FIG. 5E, a user touches touchpad 402 in a quick motion in forward lateral direction (indicated by the arrow 410), and a gesture recognition library of mobile device 400 can interpret the user's touch input and determine the touch input corresponding to a forward lateral flick event or gestures associated with touchpad 402. In the example of FIG. 5F, a user touches touchpad 402 in a quick motion in backward lateral direction (indicated by the arrow 412), and a gesture recognition library of mobile device 400 can interpret the user's touch input and determine the touch input corresponding to a backward lateral flick event or gesture associated with touchpad 402.

Figure 5H:
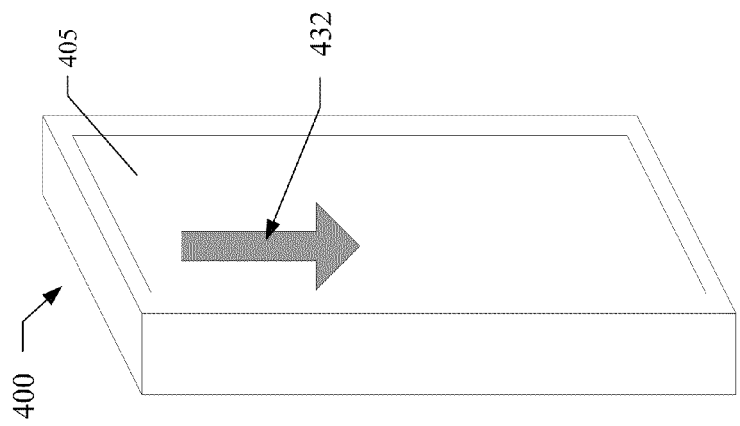
FIG. 5G-5I illustrate example touch events associated with the example mobile device of FIG. 4B.
Figure 5G:
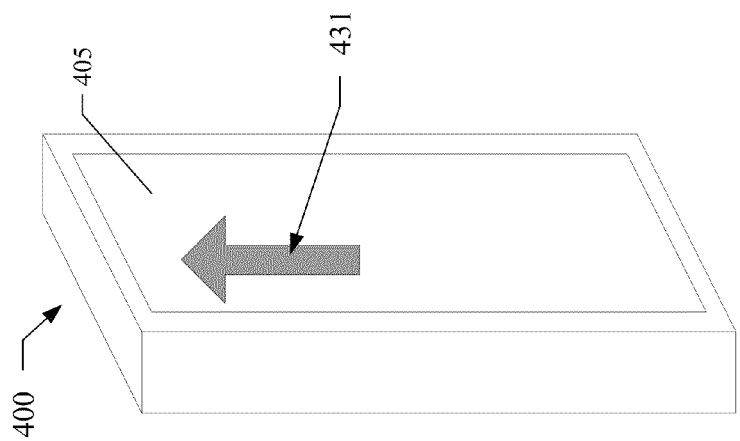
Figure 5I:
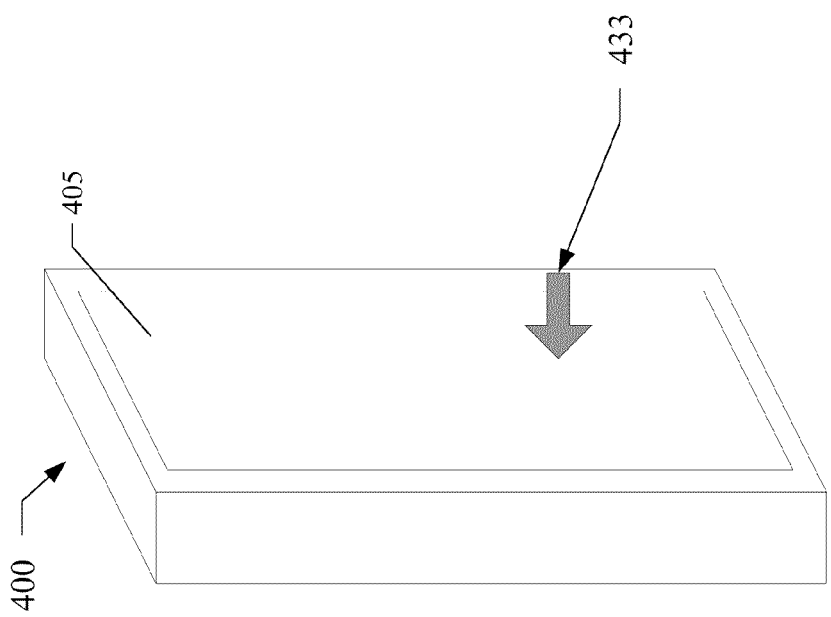
Figure 6:
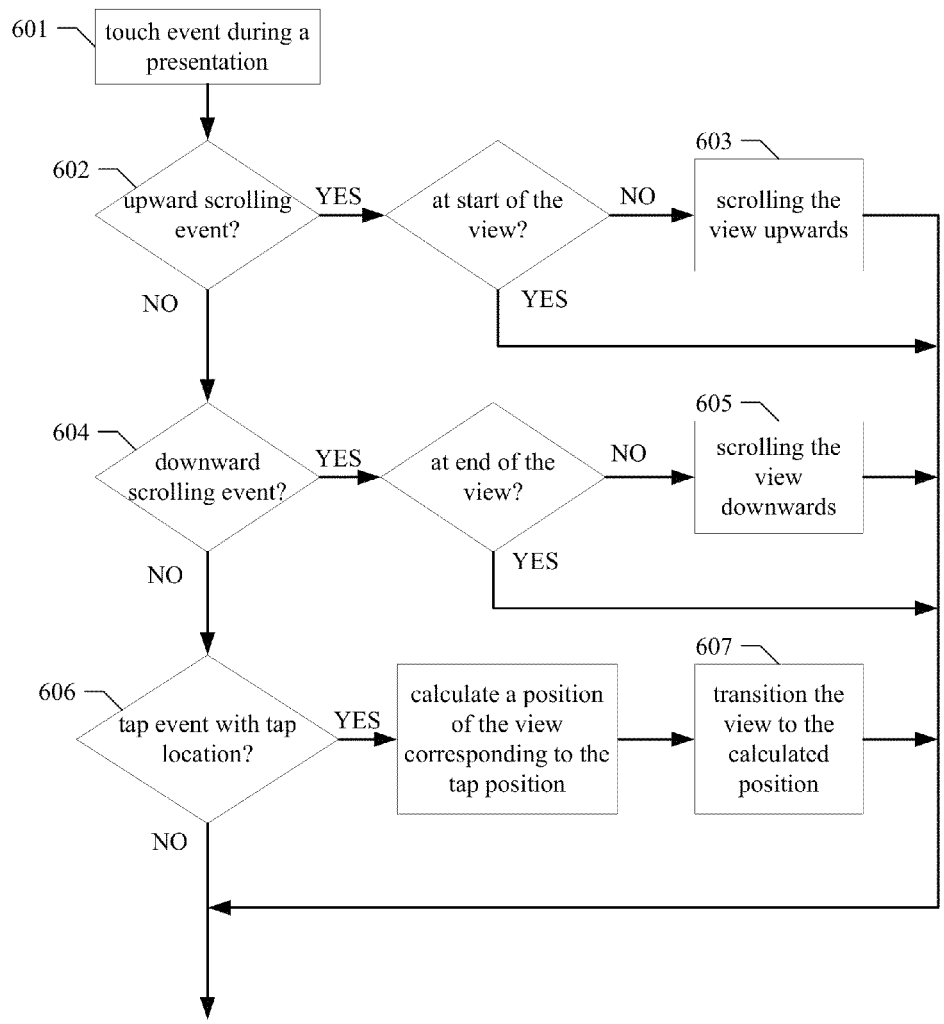
FIG. 6 illustrates an example method of scrolling and transitioning an application user interface by using a side-mounted touchpad.

In other embodiments, mobile device 400 may identify touch events associated with back-mounted touch surface 405, as illustrated in FIGS. 5G and 5H. In the example of FIG. 5G, a user touches back-mounted touch surface 405 in an upward motion (as indicated by the arrow 431). A gesture recognition library of mobile device 400 can interpret the user's touch input and identify the touch input corresponding to an upward scrolling event or gesture associated with back-mounted touch surface 405. In the example of FIG. 5H, a user touches back-mounted touch surface 405 in a downward motion (as indicated by the arrow 432). A gesture recognition library of mobile device 400 can interpret the user's touch input and identify the touch input corresponding to a downward scrolling event or gesture associated with back-mounted touch surface 405. In the example of FIG. 5I, a user taps or strikes lightly on back-mounted touch surface 405 (as indicated by the arrow 433). A gesture recognition library of mobile device 400 can interpret the user's touch input and identify the touch input corresponding to a tap event associated with back-mounted touch surface 405. The gesture recognition library may also determine a tap location of a tap event associated with back-mounted touch surface 405. The gesture recognition library can determine a tap location based on a relative location or zone corresponding to back-mounted touch surface 405, as described similarly in FIGS. 5C and 5D.

In contrast to using touch gestures on a touch screen to scroll or transition an application user interface displayed by the touch-screen as illustrated in the example of FIGS. 3A-3C, FIG. 6 illustrates an example method of scrolling and transitioning an application user interface, or a user interface of an application, by using a side-mounted touchpad. Specifically, the example method of FIG. 6 may enable a user to scroll upwards/downwards an application user interface by swiping across a side-mounted touchpad longitudinally, and transition to a particular position of the application user interface by tapping the side-mounted touchpad at a particular location.

By registering a handler function for touch events, the handler function can, responsive to a touch event, cause the application user interface to scroll upwards/downwards or transition to a particular position. In particular embodiments, when a touch event occurs during presentation of an application user interface (601), the handler function may determine a position of the application user interface corresponding to the touch event (i.e., the position of the content being presented by the application). For example, a handler function of a web browser application can determine a position of a web page being displayed by the web browser application's user interface when a touch event occurs.

In particular embodiments, the handler function may determine if the touch event is a upward scrolling event (602). In particular embodiments, if the touch event is a upward scrolling event, and if the position is not at the start of the application user interface, the handler function may cause the application user interface to scroll upwards (603). As in the web browser application example above, the handler function can cause the web browser application's user interface to scroll upwards, or scroll up the web page, if the web browser application's user interface is not displaying the top of the web page already when the touch event occurs.

In particular embodiments, the handler function may determine if the touch event is a downward scrolling event (604). In particular embodiments, if the touch event is a downward scrolling event, and if the position is not at the end of the application user interface, the handler may cause the application user interface to scroll downwards (605). As in the web browser application example above, the handler function can cause the web browser application's user interface to scroll downwards, or scroll down the web page, if the web browser application's user interface is not displaying the bottom of the web page already when the touch event occurs.

In particular embodiments, the handler function may determine if the touch event is a tap event with a tap location (606). In particular embodiments, if the touch event is a tap event with a tap location, the handler function may cause the application to calculate a position of the application user interface corresponding to the tap location, and transition display of the application user interface to the calculated position (607). As in the web browser application above, if the handler function determines a relative tap location of 70% from the top of touchpad 402 (as illustrated in FIG. 5C), the handler function can cause the web browser application's user interface to display the web page starting at 70% of the length of the web page. For example, if the handler function determines a particular zone of touchpad 402 for the tap location (as illustrated in FIG. 5D), the handler function can cause the web browser application's user interface to display the web page at a location corresponding to the particular zone, e.g., display the end of the web page if the particular zone is zone 4 (or the last zone from the top), display the beginning of the web page if the particular zone is zone 1 (or the first zone from the top), or display the middle of the web page if the particular zone is zone 3.

Particular embodiments may enable transitioning of an application user interface in more than one axis of the user interface by using touch gestures associated with touchpad 402. For example, in addition to scrolling up/down a web page by using an upward/downward scrolling gesture associated with touchpad 402 as described in the web browser example above, a user can transition the display of the web page to the left edge of the web page by using a forward lateral flick gesture associated with touchpad 402 (as illustrated in FIG. 5E), if the web browser's application user interface is not displaying the left edge of the web page. For example, a user can transition the display of a web page to the right edge of the web page by using a backward lateral flick gesture associated with touchpad 402 (as illustrated in FIG. 5F), if the web browser's application user interface is not displaying the right edge of the web page.

Particular embodiments may enable scrolling and transitioning of an application user interface by using the back-mounted touch surface as described earlier. Using the web browser application example above, a user can scroll up an web page displayed by the web browser application, if the web browser application's user interface is not displaying the top of the web page, by using an upward scrolling gesture associated with back-mounted touch surface 405. For example, the user can scroll down the web page, if the web browser application's user interface is not displaying the bottom of the web page, by using a downward scrolling gesture associated with back-mounted touch-surface 405. For example, the user can transition the display of the web page to the middle of the web page by tapping at the middle of back-mounted touch-surface 405.

The scrolling and tap gestures described above can be utilized in connection with a variety of applications and computing devices. For example, as discussed above, the scrolling and tap gestures may be used in connection with an application user interface for scrolling and transitioning of the application user interface along at least one axis relative to the application user interface's display. In such an implementation, the scrolling and tap gestures may be used to scroll upwards/downwards or go to a particular position of a web page displayed by a web browser client application. In such an implementation, the scrolling and tap gestures may be used to scroll upwards/downwards or go to a particular position of a contact list displayed by an address book client application. In addition, the scrolling and tap gestures can be utilized in connection with an application presenting a content that has a linear range. For example, an audio or video clip has a linear range in time (e.g., starting at time 0:00:00 and ends at time 0:03:45, or starting at frame 0 and ends at frame 9876). In such an implementation, the scrolling gestures may be used to fast forwards/backwards an audio or video clip being presented by a media player client application, and the tap gesture may be used to transition the audio or video clip to a particular time stamp or frame corresponding to a tap location of the tap gestures. As yet for another example, an audio or video clip can have a linear range in sound volume (e.g., measured in decibels). In such an implementation, the scrolling gesture may be used to adjust the sound volume of an audio or video clip being presented by a media player client application, and the tap gesture may be used to adjust the sound volume to a particular value corresponding the a tap location of the tap gesture. Additionally, an application may create its own usage of the touch gestures described hereinbefore by using an application programming interface (API) communicating with an operating system and/or other software programs (e.g., device drivers for touch screen and/or touchpads, gesture recognition library, etc.) of mobile device 400.

Figure 7:
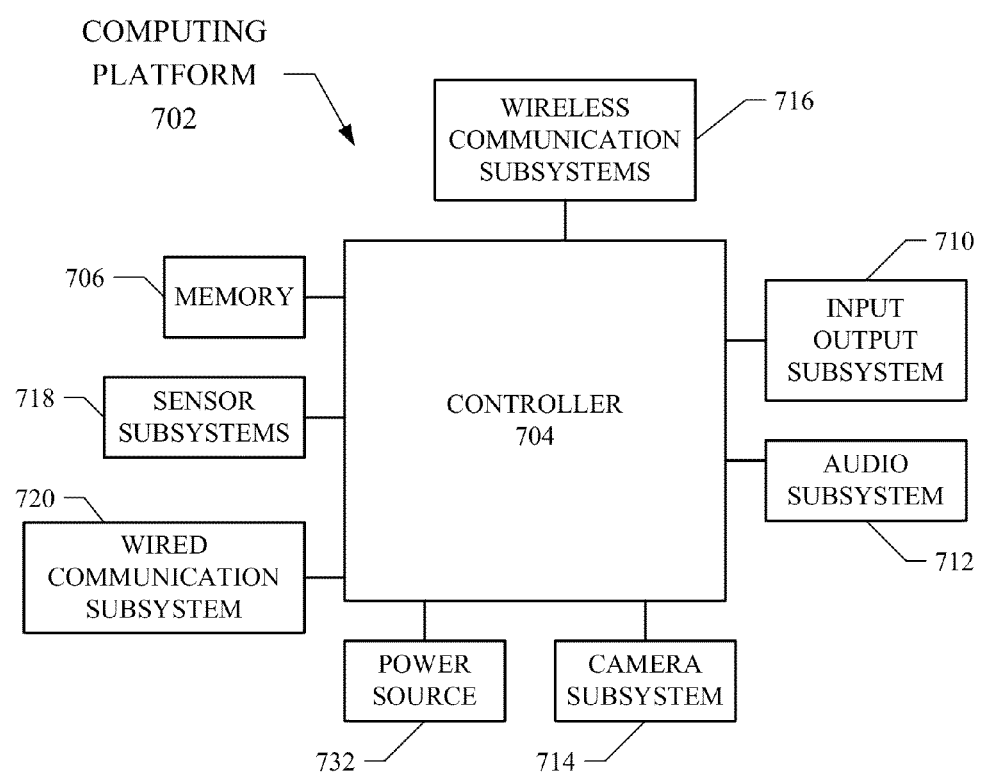
FIG. 7 illustrates an example mobile device platform.

The application and functionality described above can be implemented as a series of instructions stored on a computer-readable storage medium that, when executed, cause a programmable processor to implement the operations described above. While the mobile device 500 may be implemented in a variety of different hardware and computing systems, FIG. 7 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors and/or one or more microcontrollers configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be Windows-based, Mac-based, or Unix or Linux-based, Symbian-based, or Android-based, among other suitable operating systems. The operating system, other computer code and/or data may be physically stored within memory 706 that is operatively coupled to controller 704.

Memory 706 may encompass one or more storage media and generally provide a place to store computer code (e.g., software and/or firmware) and data that are used by computing platform 702. By way of example, memory 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 704. Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input-output subsystem may include keyboard, mouse, one or more buttons, thumb wheel, and/or display (e.g., liquid crystal display (LCD), light emitting diode (LED), Interferometric modulator display (IMOD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touchpad and touch screen. A touchpad is an input device including a surface that detects touch-based inputs of users. Similarly, a touch screen is a display that detects the presence and location of user touch inputs. Input output system 710 may also include dual touch or multi-touch displays or touchpads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, and/or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 720 can include a Universal Serial Bus (USB) port for file transferring, or a Ethernet port for connection to a local area network (LAN). Additionally, computing platform 702 may be powered by power source 732.

Wireless communication subsystem 716 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). Additionally, wireless communication subsystem 716 may include hosting protocols such that computing platform 702 may be configured as a base station for other wireless devices.

Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, and/or biometric sensor for security application (e.g., fingerprint reader). Other input/output devices may include an accelerometer that can be used to detect the orientation of the device.

In particular embodiments, various components of computing platform 702 may be operably connected together by one or more buses (including hardware and/or software). As an example and not by way of limitation, the one or more buses may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a MultiMediaCard (MMC) card, an embedded MMC (eMMC) card, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of controller 704 (such as, for example, one or more internal registers or caches), one or more portions of memory 705, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, JavaScript, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
by a computing device, detecting a first touch event during presentation of an application user interface, wherein the first touch event occurs on a side-mounted touch sensor of the computing device, wherein the application user interface is presented on a display of the computing device, and wherein the application user interface presents content having a linear range in time and a linear range in volume, the content comprising a plurality of frames, each frame associated with a respective time in the linear range in time;
by the computing device, determining a first position within the linear range in time of the content presented by the application user interface that corresponds to a location of the first touch event on the side-mounted touch sensor, wherein the determined first position has a relative first position in the linear range in time of the content, the relative first position corresponding to a particular frame of the plurality of frames, the relative first position matching the relative location of the first touch event along a first axis of the side-mounted touch sensor;
if the first touch event is a forward lateral gesture and the determined first position is not a start of the linear range in time of the content presented by the application user interface, then scrolling the linear range in time of the content presented by the application user interface forward in time from the determined first position;
if the first touch event is a backward lateral gesture and the determined first position within the application user interface is not an end of the linear range in time of the content presented by the application user interface, then scrolling the linear range in time of the content presented by the application user interface backwards in time from the determined first position;
if the first touch event is a tap event, then transitioning the content to the particular frame corresponding to the determined first position within the linear range in time of the content presented by the application user interface;
by the computing device, detecting a second touch event, the second touch event occurring on the side-mounted touch sensor;
by the computing device, determining that the second touch event is a gesture along a second axis of the side-mounted touch sensor;
by the computing device, determining a second position within the linear range in volume of the content presented by the application user interface that corresponds to a location of the second touch event on the side-mounted touch sensor;
if the second touch event is an upward scrolling and the determined second position is not an end of the linear range in volume of the content presented by the application user interface, then scrolling the linear range in volume upward from the determined second position; and
if the second touch event is a downward scrolling and the determined second position is not a start of the linear range in volume of the content presented by the application user interface, then scrolling the linear range in volume downward from the determined second position.

2. A device comprising:
one or more processors; and
a memory coupled to the processors comprising instructions executable by the processors, the processors being operable when executing the instructions to:
detect a first touch event during presentation of an application user interface, wherein the first touch event occurs on a side-mounted touch sensor of the computing device, wherein the application user interface is presented on a display of the computing device, and wherein the application user interface presents content having a linear range in time and a linear range in volume, the content comprising a plurality of frames, each frame associated with a respective time in the linear range in time;
determine a first position within the linear range in time of the content presented by the application user interface that corresponds to a location of the first touch event on the side-mounted touch sensor, wherein the determined first position has a relative first position in the linear range in time of the content, the relative first position corresponding to a particular frame of the plurality of frames, the relative first position matching the relative location of the first touch event along a first axis of the side-mounted touch sensor;
if the first touch event is a forward lateral gesture and the determined first position is not a start of the linear range in time of the content presented by the application user interface, then scroll the linear range in time of the content presented by the application user interface forward in time from the determined first position;
if the first touch event is a backward lateral gesture and the determined first position within the application user interface is not an end of the linear range in time of the content presented by the application user interface, then scroll the linear range in time of the content presented by the application user interface backwards in time from the determined first position;
if the first touch event is a tap event, then transition the content to the particular frame corresponding to the determined first position within the linear range in time of the content presented by the application user interface;
detect a second touch event, the second touch event occurring on the side-mounted touch sensor;
determine that the second touch event is a gesture along a second axis of the side-mounted touch sensor;

determine a second position within the linear range in volume of the content presented by the application user interface that corresponds to a location of the second touch event on the side-mounted touch sensor;

if the second touch event is an upward scrolling and the determined second position is not an end of the linear range in volume of the content presented by the application user interface, then scrolling the linear range in volume upward from the determined second position; and if the second touch event is a downward scrolling and the determined second position is not a start of the linear range in volume of the content presented by the application user interface, then scrolling the linear range in volume downward from the determined second position.

3. The device of claim 2, wherein the display comprises a touch screen.

4. The device of claim 2, wherein the side-mounted touch sensor comprises a concave surface.

5. The device of claim 2, wherein the location of the first touch event is one of a plurality of zones dividing an area of the side-mounted touch sensor.

6. One or more computer-readable non-transitory storage media embodying software that is operable when executed by a computing device to:

detect a first touch event during presentation of an application user interface, wherein the first touch event occurs on a side-mounted touch sensor of the computing device, wherein the application user interface is presented on a display of the computing device, and wherein the application user interface presents content having a linear range in time and a linear range in volume, the content comprising a plurality of frames, each frame associated with a respective time in the linear range in time;

determine a first position within the linear range in time of the content presented by the application user interface that corresponds to a location of the first touch event on the side-mounted touch sensor, wherein the determined first position has a relative first position in the linear range in time of the content, the relative first position corresponding to a particular frame of the plurality of frames, the relative first position matching the relative location of the first touch event along a first axis of the side-mounted touch sensor;

if the first touch event is a forward lateral gesture and the determined first position is not a start of the linear range in time of the content presented by the application user interface, then scroll the linear range in time of the content presented by the application user interface forward in time from the determined first position;

if the first touch event is a backward lateral gesture and the determined first position within the application user interface is not an end of the linear range in time of the content presented by the application user interface, then scroll the linear range in time of the content presented by the application user interface backwards in time from the determined first position;

if the first touch event is a tap event, then transition the content to the particular frame corresponding to the determined first position within the linear range in time of the content presented by the application user interface;

detect a second touch event, the second touch event occurring on the side-mounted touch sensor;

determine that the second touch event is a gesture along a second axis of the side-mounted touch sensor;

determine a second position within the linear range in volume of the content presented by the application user interface that corresponds to a location of the second touch event on the side-mounted touch sensor;

if the second touch event is an upward scrolling and the determined second position is not an end of the linear range in volume of the content presented by the application user interface, then scrolling the linear range in volume upward from the determined second position; and if the second touch event is a downward scrolling and the determined second position is not a start of the linear range in volume of the content presented by the application user interface, then scrolling the linear range in volume downward from the determined second position.

7. The method of claim 1, wherein the display comprises a touch screen.

8. The method of claim 1, wherein the side-mounted touch sensor comprises a concave surface.

9. The method of claim 1, wherein the location of the first touch event is one of a plurality of zones dividing an area of the side-mounted touch sensor.

10. The media of claim 6, wherein the display comprises a touch screen.

11. The media of claim 6, wherein the side-mounted touch sensor comprises a concave surface.

12. The media of claim 6, wherein the location of the first touch event is one of a plurality of zones dividing an area of the side-mounted touch sensor.

13. The method of claim 1, wherein the content comprises a video file.

* * * * *